United States Patent

Appalucci et al.

[11] Patent Number: 5,841,350
[45] Date of Patent: Nov. 24, 1998

[54] ELECTRONIC SECURITY TAG USEFUL IN ELECTRONIC ARTICLE INDENTIFICATION AND SURVEILLANCE SYSTEM

[75] Inventors: Lawrence Appalucci, Villanova, Pa.; John H. Bowers, Clarksburg, N.J.; Gary T. Mazoki, Sewell, N.J.; Thomas J. McKeown, Pennsauken, N.J.; Anthony F. Piccoli, Audubon, N.J.; Mark J. Rankin, Media, Pa.; Stanley Tocker, Wilmington, Del.

[73] Assignee: Checkpoint Systems, Inc., Thorofare, N.J.

[21] Appl. No.: 884,409

[22] Filed: Jun. 27, 1997

[51] Int. Cl.⁶ .................................... G08B 13/14
[52] U.S. Cl. .............................. 340/572; 524/910
[58] Field of Search ................ 340/572; 361/1, 361/56, 91, 117, 118; 257/173, 355; 427/96, 123; 524/910

[56] References Cited

U.S. PATENT DOCUMENTS

| | | | |
|---|---|---|---|
| 4,021,705 | 5/1977 | Lichtblau | 340/572 X |
| 4,498,076 | 2/1985 | Lichtblau | 340/572 |
| 4,717,438 | 1/1988 | Benge et al. | 340/572 X |
| 4,728,938 | 3/1988 | Kaltner | 340/572 |
| 4,778,552 | 10/1988 | Benge et al. | 340/572 X |
| 4,818,312 | 4/1989 | Benge | 340/572 X |
| 4,835,524 | 5/1989 | Lamond et al. | 340/572 |
| 4,846,922 | 7/1989 | Benge et al. | 340/572 X |
| 4,910,499 | 3/1990 | Benge et al. | 340/572 |
| 5,103,210 | 4/1992 | Rode et al. | 340/572 |
| 5,142,270 | 8/1992 | Appalucci et al. | 340/572 |
| 5,182,544 | 1/1993 | Aquilera et al. | 340/572 |
| 5,276,431 | 1/1994 | Piccoli et al. | 340/572 |
| 5,334,635 | 8/1994 | Udipi | 524/377 |
| 5,355,120 | 10/1994 | Ferguson et al. | 340/572 |
| 5,378,405 | 1/1995 | Gutman et al. | 252/62 |
| 5,494,550 | 2/1996 | Benge | 340/572 X |

*Primary Examiner*—Thomas J. Mullen, Jr.
*Attorney, Agent, or Firm*—Panitch Schwarze Jacobs & Nadel, P.C.

[57] ABSTRACT

A resonant tag circuit useful as an electronic security device includes a layered planar structure having a dielectric substrate, a resonant circuit carried on both sides of the dielectric substrate and a semiconductive material having an ionizable salt dissolved therein. The semiconductor material provides a sermiconductive bridge across an activation or deactivation point in the circuit and connects the conductive circuit on both sides of the activation or deactivation point. The resonant tag circuit of this invention is stabilized against premature operation of the activation or deactivation point from electrostatic discharge.

27 Claims, 6 Drawing Sheets

Fig. 1

COIL SIDE

Fig. 2

CAPACITOR SIDE

ELECTRONIC SECURITY TAG USEFUL IN ELECTRONIC ARTICLE INDENTIFICATION AND SURVEILLANCE SYSTEM

BACKGROUND OF THE INVENTION

The invention relates to electronic security tags having a detectable, activatable and deactivatable resonant circuit and, more particularly, to resonant tag circuits stabilized against electrostatic discharge.

Electronic article surveillance (EAS) systems are widely used in commercial establishments to deter theft or other unauthorized removal of articles of merchandise from the surveillance area. In one commonly used EAS system, each article or item to be protected carries a security tag (which may be affixed on or inside packaging or a label for the article or item, or on or inside the article or item itself) containing an electronic circuit, such as an inductor/capacitor resonant circuit. The resonant tag circuit is detected or identified by equipment for establishing a radio frequency (RF) electromagnetic field in a surveillance zone at the exit from the surveillance area.

The detectable resonant circuit on the tags used with such EAS systems is a small, generally planar, multilayer structure having a dielectric substrate and conductive layers on opposite sides of the substrate that define an inductor and at least one capacitor that cooperate to provide a circuit resonant at at least one predetermined detection frequency.

Removal of a tagged article from the surveillance area is typically authorized at a checkout counter, where the clerk deactivates the tag. The security tag may be deactivated by changing the resonant frequency of the tag so that the tag resonates outside of the predetermined detection frequency or by altering the resonant circuit so that the circuit no longer resonates at all.

A preferred and highly effective deactivation technique described in the prior art is one that is accomplished electronically, by passing the tagged article through a deactivating RF field that disables the detectable resonant circuit. Such deactivation involves exposing the resonant tag circuit to an RF field having a predetermined minimum energy level sufficient to cause either short circuiting of the resonant circuit or creation of an open circuit and thereby prevent the circuit from resonating at the predetermined detection frequency. Deactivatable resonant tags of this type are described by Lichtblau in U.S. Pat. Nos. 4,021,705 and 4,498,076, Benge et al. in U.S. Pat. No. 4,910,499.

In addition to being deactivatable, resonant tag circuits that are capable of being selectively activated by electronic means are highly useful since tags are often applied by manufacturers to all goods, even though some retailers of such internally tagged goods may not utilize EAS systems. Activatable resonant tag circuits avoid the likelihood of unwanted detection/identification alarms and provide distributors/retailers with greater flexibility in their handling of such tagged goods. Rode et al. in U.S. Pat. No. 5,103,210 describe resonant tags containing a resonant circuit with multiple capacitors that provide the tags with multiple resonant frequencies, in which both activation of an initial tag detection frequency and subsequent deactivation are accomplished in a similar manner, using different resonant frequencies that, at predetermined energy levels, are targeted to disable, e.g., short circuit, specific capacitors in the resonant circuit.

In the deactivation means described in Lichtblau '076 and in the activation/deactivation means of Rode et al., a portion of one conductor in the multilayer resonant tag circuit is indented or "dimpled". Deactivation or activation, as the case may be, is accomplished by exposure of the tag to a specific RF field at a predetermined energy level that causes a short circuit at the indent or dimple which results in the desired deactivation or activation of the resonant circuit being targeted.

For many microelectric devices, the accumulation of static electricity or electrostatic charge generation, e.g., tribocharging associated with friction between surfaces during manufacture or handling, is a common occurrence that can lead to inadvertent and unwanted adverse consequences, and resonant tag circuits are no exception. Under certain circumstances, buildup of static electricity during manufacture, application, distribution or use of resonant tag circuits can result in discharge of sufficient energy to cause premature deactivation, activation or destruction of the tags.

One approach for providing electrostatic discharge protection is described by Aquilera et al. in U.S. Pat. No. 5,182,544 which utilizes a frangible conductive frame member for static charge dissipation. The frame member temporarily shunts the opposing plates of the capacitors on each tag circuit, maintaining all of the capacitor plates at the same electrical potential and thereby preventing an electrostatic charge from discharging through a capacitor during manufacture, shipment and storage of the tag. The conductive frame member is broken to activate the tag when the tag is applied to an article to be protected, so this technique does not provide continued protection through the entire life cycle of the tag.

Another approach for providing electrostatic discharge protection during tag manufacture is that described by Benge et al. in U.S. Pat. No. 4,910,499 for avoiding premature deactivation of the tags during printing, in which a film of electrostatic-charge-draining material is applied to the outside of a release liner overlaying a continuous web carrying many tags. The film may be adhesive-bearing copper or aluminum stripes or metal powder ink coatings or stripes. Alternatively, the film coating may be an aqueous alcohol solution of a fatty acid-based quaternary ammonium antistatic compound. A drawback to use of such aqueous-based antistatic agents is the delay before subsequent operational steps are able to be performed on the fast-moving tag web, caused by the need to evaporate the solvent at elevated temperature, which itself can be detrimental to the deactivatable tags on the tag webs. A variation of the Benge '499 technique is described in U.S. Pat. No. 5,494,550 of Benge.

An object of the present invention is a resonant tag circuit that is protected against electrostatic discharge, where the protection of electronic security tag is effective not only during the manufacturing process but also throughout the entire life cycle of the tag, including the time when the tag is actively in use in an electronic article surveillance or identification system. Another object of the invention is a resonant tag circuit that maintains protection against unwanted electrostatic discharge even after physically being separated from a continuous web of such tag circuits.

SUMMARY OF THE INVENTION

According to the present invention, a resonant tag circuit useful as an electronic security device includes a layered planar structure having a dielectric substrate with first and second opposing principal surfaces; a resonant circuit capable of resonating at at least one predetermined frequency and comprising a pattern of conductive material carried on each of the opposing surfaces of the dielectric substrate, said resonant circuit including at least one activation or deactivation point for creating a short circuit or open circuit in the resonant circuit upon exposure of the resonant circuit to an activation or deactivation field at a predetermined energy level; and a semiconductive antistatic material having an ionizable salt dissolved therein, said antistatic material being applied on a portion of at least one surface of the dielectric substrate to provide a semiconductive bridge across at least one activation or deactivation point in the resonant circuit by contacting conductive material in the circuit on both sides of the point.

In another embodiment, the resonant circuit includes a parallel plate capacitor having a first plate on the first surface of the dielectric substrate and a second plate on the second surface of the dielectric substrate, said second plate being electrically connected through the dielectric substrate to a conductive member located on said first surface in proximity to, but not contacting, the first plate; and a semiconductive antistatic material containing an ionizable salt that overlays and contacts at least a portion of the first plate and at least a portion of the conductive member to provide a semiconductive bridge between said first plate and said conductive member. The capacitor preferably comprises a deactivation point on at least one plate of the capacitor for activating or deactivating the capacitor in the resonant circuit by creating a short circuit in the capacitor upon exposure of the resonant circuit to a predetermined activation or deactivation field. The deactivation point is preferably at least one indentation point on the plate.

A significant advantage provided by this invention is that the resonant tag circuit is stabilized indefinitely against inadvertent failure from premature operation of the activation or deactivation point from electrostatic discharge. The stabilization protection extends not only through the tag manufacturing steps but also after removal of the tag from the continuous tag web. The antistatic protection provided in this invention continues throughout the entire life cycle of the resonant tag circuit, during application of individual tags to articles or items to be protected, during distribution and handing of such goods, and while the tag is affixed or otherwise carried with such goods that are protected in an electronic article surveillance or identification system. The ability of the method of the present invention to provide continued protection of the resonant tag circuit throughout the entire life cycle of the tag differentiates the stabilization method of this invention from many prior art techniques, which provide antistatic protection only during manufacture of the continuous tag web.

BRIEF DESCRIPTION OF THE SEVERAL VIEWS OF THE DRAWING

The foregoing summary, as well as the following detailed description of preferred embodiments of the invention, will be better understood when read in conjunction with the appended drawings. For the purpose of illustrating the invention, there are shown in the drawings embodiments which are presently preferred, it being understood, however, that the invention is not limited to the specific arrangements and instrurnentalities disclosed. In the Drawings.

DETAILED DESCRIPTION OF THE INVENTION

Certain terminology is used in the following description for convenience only and is not limiting. The words "top", "bottom", "upper" and "lower" designate directions in the drawings to which reference is made. The terminology includes the words specifically mentioned, as well as derivatives thereof and words of similar import.

Referring now to the drawings, wherein the same reference numeral designations are applied to corresponding elements throughout the several figures, there is shown in FIGS. 1, 2, 3A and 3B an activatable and deactivatable resonant tag circuit, generally designated 10, for use as an electronic article identification tag in accordance with a preferred embodiment of the present invention.

With certain exceptions hereinafter described, the resonant tag circuit 10 is generally of a type which is known in the art of electronic article security systems. As is also known in the art, the tag 10 is adapted to be secured or otherwise borne by an article, or the packaging or label of such article for which security, identification or surveillance is sought. The tag 10 may be secured to the article (or its packaging or label) at a retail store or other similar facility or, as is presently preferred, by the manufacturer or distributor of the article.

The resonant tag circuit 10 is employed in connection with electronic article security systems (not shown), particularly electronic article security systems of the radio frequency or RF electromagnetic field type. Such electronic article security systems are well known in the art and a complete description of the structure and operation of such electronic article security systems is consequently not necessary for an understanding of the present invention. Suffice it to say that such electronic article security systems establish a surveillance or identification zone, generally proximate to an entrance and/or exit of a facility such as a retail store. The security system's function is to detect the presence within the surveillance or identification zone of an article having an active (iLe., not deactivated) resonant tag circuit secured thereto (or to the corresponding packaging or label).

A typical electronic article security system employing the resonant tag circuit 10 includes means for transmitting electromagnetic energy at or near the resonant frequency of the tag 10 into or through the surveillance zone and means for detecting a field disturbance that the presence of an active security tag resonating circuit causes, to establish the presence of a resonant tag circuit 10 and thus its protected article, within the surveillance zone. The resonant circuit 12 may comprise one or more inductive elements electrically connected to one or more capacitive elements.

Figure 1:
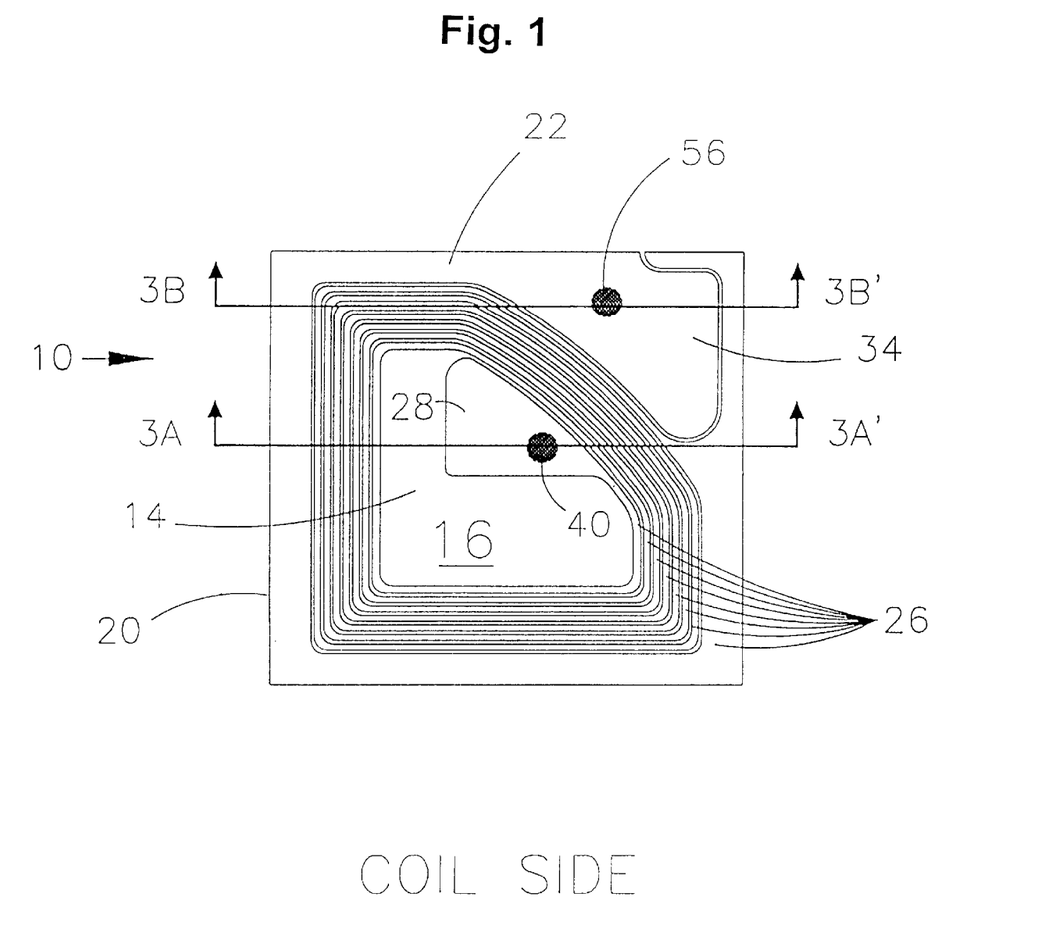
FIG. 1 shows an enlarged plan view of a first side ("coil side") of an activatable and deactivatable resonant tag circuit in accordance with the present invention.
Figure 2:
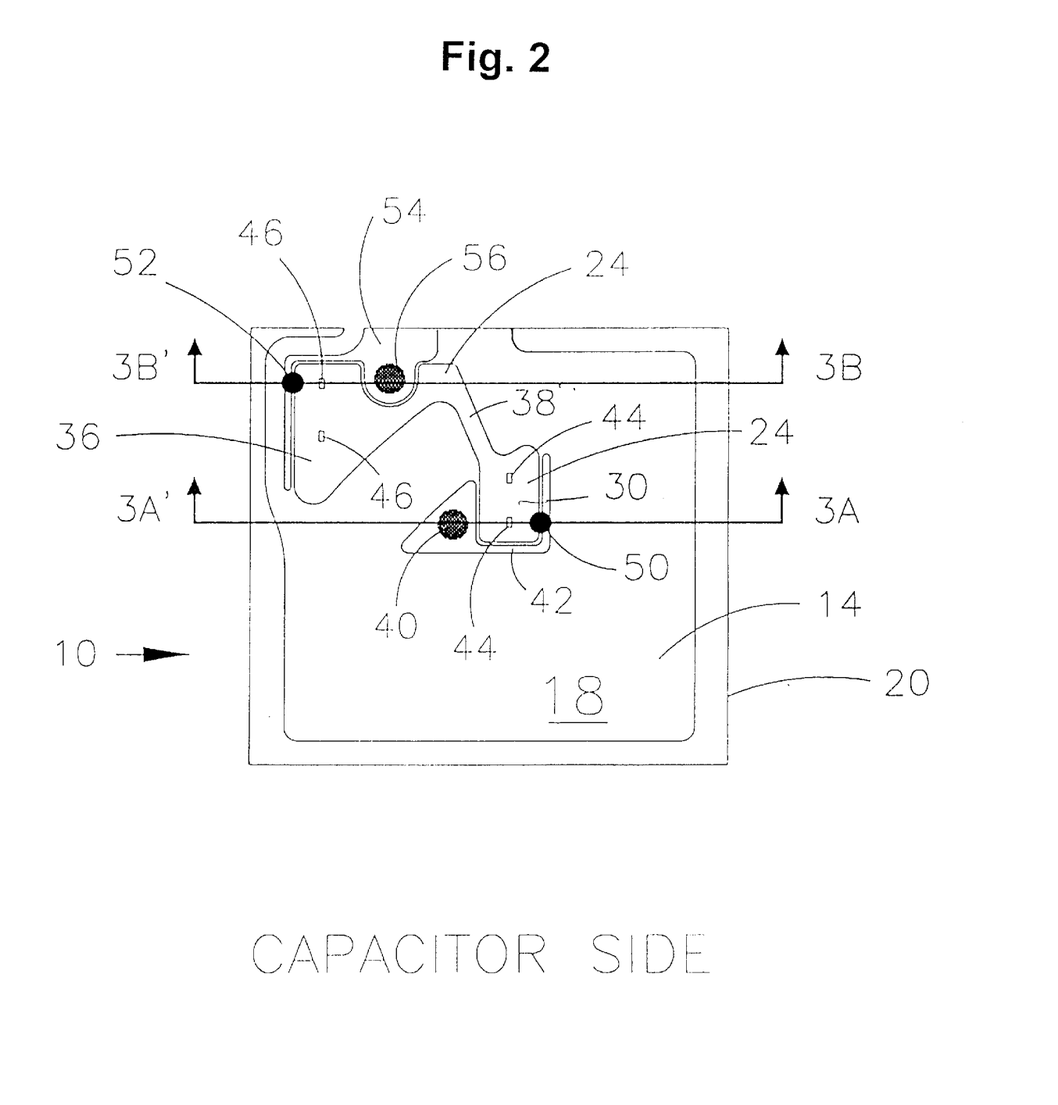
FIG. 2 shows an enlarged plan view of the second side ("capacitor side") of the activatable and deactivatable resonant tag circuit of FIG. 1.
Figure 3A:
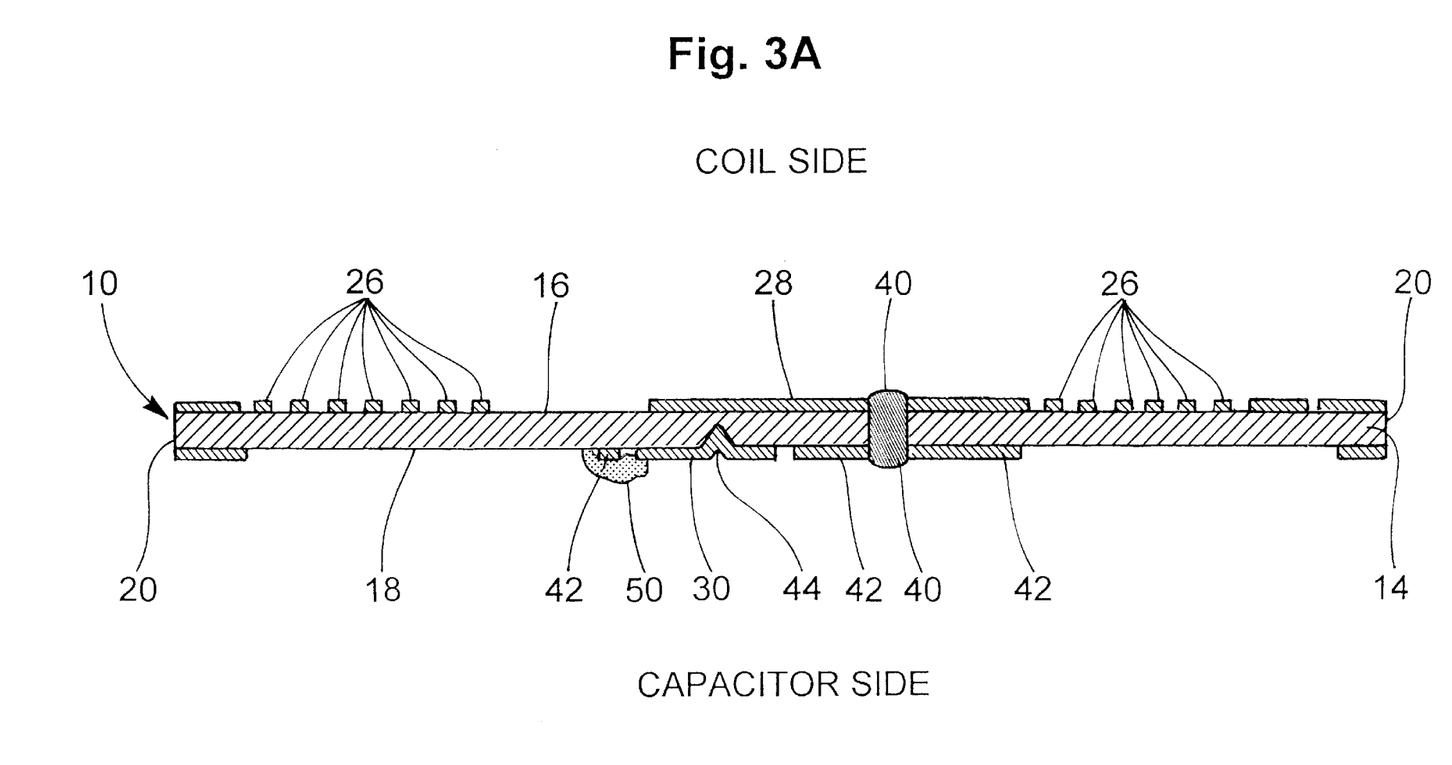
FIGS. 3A and 3B are cross-sectional views of a portion of the activatable/deactivatable resonant tag circuit tag shown in FIGS. 1 and 2, taken along the respective lines 3A–3A' and 3B–3B'.
Figure 3B:
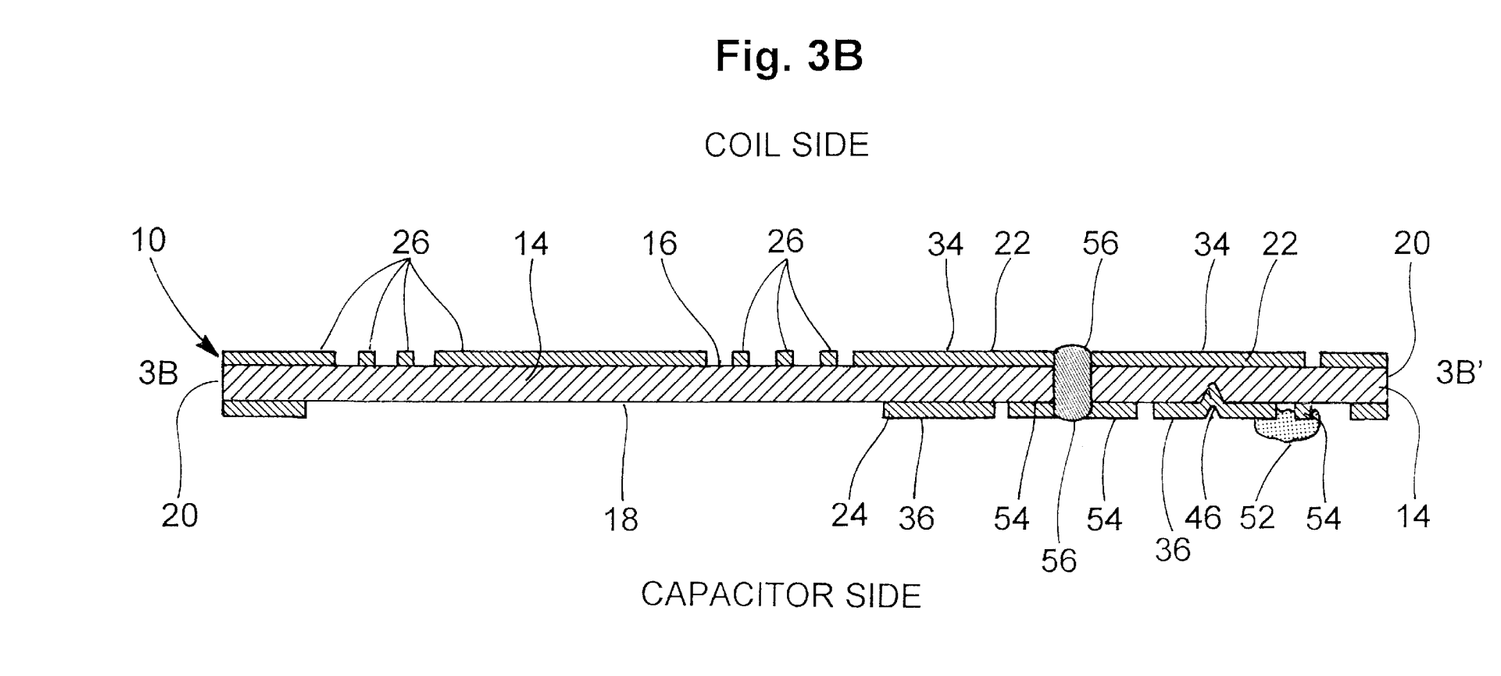

Use of the activatable/deactivatable resonant tag circuit of the type shown in FIGS. 1–3 requires a means for activating the resonant tag circuit, by causing a resonant frequency shift in the resonant tag circuit that allows detection or identification of the tag secured to the article. This resonant frequency shift is accomplished by exposure of the resonant tag circuit to an activating means in the security system that creates an activation field by transmitting electromagnetic energy at a specific activating frequency and at a predetermined energy level in an activation zone, the activating field and frequency generally being different from the detection/identification field and frequency. The activation field operates at a predetermined energy level that is sufficiently high in intensity or strength to trigger activation.

Figure 4:
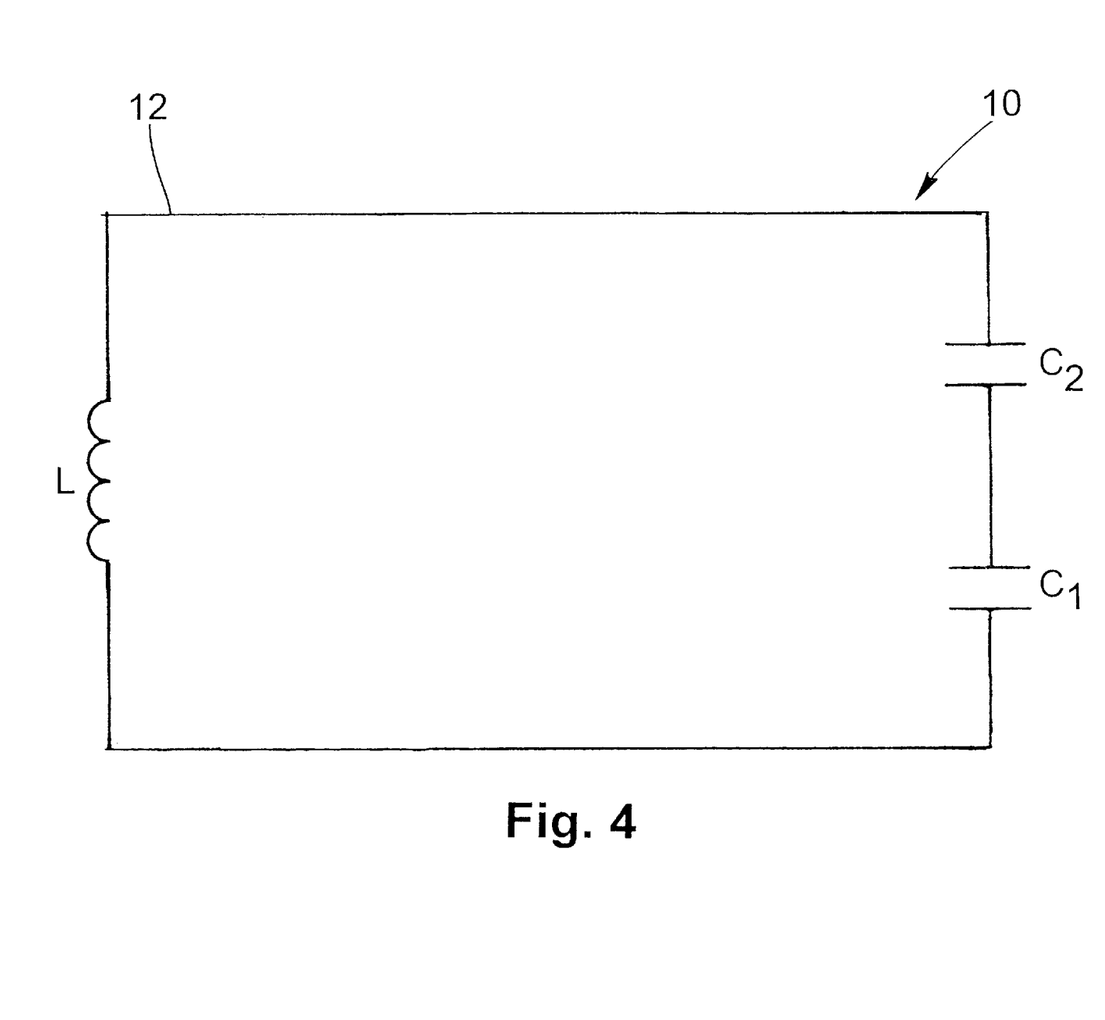
FIG. 4 is an electrical schematic of a resonant tag circuit used in the embodiment of the present invention shown in FIGS. 1, 2, 3A and 3B.

Referring now to FIG. 4, an electrical schematic diagram of the resonant tag circuit 10 is shown. In the preferred embodiment shown in FIG. 4, the resonant tag circuit 10 includes components, hereinafter described in greater detail, which establish a resonant circuit 12 that resonates at a specific activation frequency, when exposed to a predetermined level of electromagnetic energy in the activation field, and resonates at a second specific detection/identification frequency, which is utilized for the resonant tag circuit to function for identification and detection purposes. In a preferred embodiment, the resonant circuit 12 is formed by the combination of a single inductive element, inductor or coil L, electrically connected with two capacitance elements, capacitors $C_1$ and $C_2$, all in a series loop, forming an inductive capacitance (LC) resonant circuit 12. Such a resonant circuit is shown and described in detail by Rode et al. in U.S. Pat. No. 5,103,210, which is hereby incorporated by reference. The size of the inductor L and the values of capacitors $C_1$ and $C_2$ are determined based upon the desired activation and detection/identification resonant frequencies of the resonant circuit 12.

In the presently preferred embodiment whose schematic is shown in FIG. 4, the resonant tag circuit 10 preferably is designed to resonate at a first, activation frequency, when capacitors $C_1$ and $C_2$ are both functional, and to resonate at a second, detection/identification frequency once capacitor $C_1$ has been deactivated by short circuiting at a deactivation point. The resonant tag circuit resonates at or near an activation frequency of 14.5 MHz, sometimes referred to as the passive frequency. Upon deactivation of capacitor $C_1$ by short circuiting, the activated resonant tag circuit undergoes a resonant frequency shift to a second frequency at or near 8.2 MHz, which is a commonly employed detection/identification frequency used in electronic security systems. It will be apparent to those of ordinary skill in the art that the activation and detection/identification frequencies selected for use in an EAS system may vary according to local conditions and regulations; thus, these specific frequencies are not to be considered a limitation of the present invention. Deactivation of the activated tag, which is typically effected at the point of sale and which is described in more detail below, prevents the resonant circuit from resonating within the detection/identification frequency range so that the electronic security system no longer detects when the article passes through the surveillance zone of the electronic security system.

FIGS. 1 and 2 illustrate opposite sides or principal surfaces of a preferred physical embodiment of the resonant tag circuit 10 which is schematically illustrated by FIG. 4. FIG. 1 shows what may be referred to as the inductor side or "coil side" of the resonant tag circuit, and FIG. 2 shows what may be referred to as the "capacitor side" of the resonant tag circuit. FIG. 3A illustrates a cross-section view of the resonant tag circuit 10, taken across line 3A–3A' in FIGS. 1 and 2, and FIG. 3B illustrates a cross-section view of the resonant tag circuit 10, taken across line 3B–3B' in FIGS. 1 and 2.

Referring now to FIGS. 1, 2, 3A and 3B, the resonant tag circuit 10 is a generally square (but is not limited to this configuration or shape) multilayered planar device which comprises a dielectric substrate 14 containing electrically conductive areas on the respective opposite sides of the dielectric substrate 14. In the present embodiment, the dielectric substrate 14 is preferably thin, flexible and substantially planar. The dielectric substrate 14 is preferably a continuous film. The aforementioned characteristics of the dielectric substrate are particularly useful in fabrication of the resonant tag circuit 10, enabling a series of tags to be fabricated from a continuous web, as is well known in the art. Flexibility also allows the resonant tag circuit 10 to be attached to a variety of articles (not shown) having non-planar surfaces.

In the present embodiment, the dielectric substrate 14 is made from a polymeric material that is electrically nonconductive or insulative, preferably polyethylene. However, it will be recognized by those skilled in the art that the dielectric substrate 14 may be made from a variety of polymeric materials, including polyvinyl chloride, polystyrene, and other engineering plastic materials which will be evident to those skilled in the art.

The substrate 14 has a first side or principal surface 16 (the "coil side" shown in FIG. 1), a second side or principal surface 18 (the "capacitor side" shown in FIG. 2) opposing the first principal surface 16, and a peripheral outer edge 20. The circuit elements and components of the resonant circuit 12 are formed on each of the two principal surfaces of the dielectric substrate 14 by patterning electrically conductive material. A first conductive pattern 22 is carried on the first principal surface 16 of the dielectric substrate 14 (FIG. 1), which surface is arbitrarily selected as the top surface (coil side) of the resonant tag circuit 10, and a second conductive pattern 24 is carried on the opposite or second principal surface 18 of the substrate 14 (FIG. 2), sometimes referred to herein as the bottom or back surface (capacitor side). The conductive patterns 22, 24 may be formed on the substrate surfaces 16, 18, respectively, with electrically conductive materials of a known type and in a manner which is well known in the electronic article surveillance e.g., coating and etching. The conductive material 22, 24 is preferably substantially planar and flexible, being securely adhered to the thin film of dielectric substrate 14. The conductive material is preferably patterned by a subtractive process, whereby unwanted material is removed by chemical attack (e.g., etching) after desired material has been protected, typically with a printed-on etch-resistant ink. In the preferred embodiment, the electrically conductive material is aluminum. However, other electrically conductive materials (e.g., gold, nickel, copper, phosphor bronzes, brasses, solders or high density graphite) can be substituted for aluminum without changing the nature of the resonant circuit or its operation.

The resonant tag circuit 10 may be manufactured by well-known processes, such as described by Lichtblau in U.S. Pat. No. 3,913,219 entitled "Planar Circuit Fabrication Process", which is hereby incorporated herein by reference. However, other manufacturing processes can be used, and nearly any method or process of manufacturing circuit boards could be used to make the resonant tag circuit 10. One of ordinary skill in the art would understand that the process of forming the basic structure of the resonant tag circuit comprising the inductive/capacitance circuit on the dielectric substrate 14 is not specifically pertinent to an understanding of the present invention and is well known in the prior art. During manufacture, the resonant tag circuits are generally formed on a continuous web and are die cut from the web into end-to-end strips of individual tags. The individual tags are then removed or separated from the strip for use. Further description of the fabrication process is not believed to be necessary nor is it limiting.

The first and second conductive patterns 22, 24 establish a resonant circuit, such as the resonant circuit 12 shown in FIG. 4, having one resonant frequency that serves as the activation frequency, used to activate the tag for use in an EAS system, and a second frequency that is within the predetermined detection/identification frequency range of the EAS system used with the resonant tag circuit 10. As previously discussed in regard to FIG. 4, the resonant circuit 12 is formed by the combination of a single inductive element, an inductor or coil L, electrically connected with two capacitive elements, capacitors $C_1$ and $C_2$, all three in a series loop, forming an inductive/capacitance (LC) resonant circuit 12.

It should be appreciated by those skilled in the art that the inductive capacitance circuit is described with respect to a preferred embodiment of this invention and that other inductive capacitance circuits are well known in the electronic article security system art, e.g., resonant circuits including single and multiple capacitors and multiple inductors, and the latter are also within the scope of this invention. Exemplary of the preferred multiple element resonant tag circuits are those described by Rode et al. in U.S. Pat. No. 5,103,210, which is hereby incorporated herein by reference for those disclosures.

The inductive element L (FIG. 4) is formed by a coil portion 26 of the first conductive pattern 22, as shown in FIG. 1, which shows the coil side of the resonant tag circuit 10. The coil portion 26 is formed as a spiral coil of conductive material on the first principal surface 16 of the thin film of dielectric substrate 14.

The capacitive elements $C_1$ and $C_2$ (FIG. 4) are parallel plate capacitors formed of conductive material on the first and second principal surfaces 16, 18 of the dielectric substrate 14. As shown in FIGS. 1 and 2, capacitor $C_1$ comprises a first or top plate formed by a generally triangular land portion 28 of the first conductive pattern 22 on the top (first) principal surface 16 of the dielectric substrate 14 (FIG. 1), i.e., on the coil side, and a second plate formed by a corresponding generally rectangular land portion 30 of the second conductive pattern 24 on the bottom (second) principal surface 18 of the substrate 14 (FIG. 2), i.e., on the capacitor side. As will be appreciated by those of skill in the art, the first and second plates 28 and 30 are generally in registry or alignment and are separated by the dielectric substrate 14. The dielectric substrate 14 serves not only as the support substrate for the entire resonant circuit (12 in FIG. 4), but also as the dielectric of the parallel plate capacitors ($C_1$ and $C_2$ in FIG. 4) that are integral to the resonant circuit.

The first capacitor $C_1$ in this preferred embodiment is of smaller capacitance than the second capacitor, $C_2$, and is an essential part of the activation circuit but not the detection/identification circuit, as is described in more detail below. During activation of the detection/identification resonant frequency, the first capacitor is short circuited via a deactivation point located in one of the plates of $C_1$ and is thereby rendered inoperative, leaving only capacitor $C_2$ fictional in the activated resonant tag circuit.

The elements of the second capacitor $C_2$ are similar to those of the first capacitor $C_1$. As shown in FIGS. 1 and 2, capacitor $C_2$ comprises a first or top plate formed by a generally triangular land portion 34 of the first conductive pattern 22 on the coil side (FIG. 1), and a second plate formed by a corresponding generally triangular land portion 36 of the second conductive pattern 24 on the capacitor side (FIG. 2). The first and second plates 34 and 36 are generally in registry or alignment and are separated by the dielectric substrate 14. This arrangement of the elements of L, $C_1$ and $C_2$ creates the series connection of the inductor coil and two capacitors in an electrical circuit that is shown schematically in FIG. 4.

On the coil side shown in FIG. 1, the first plate 28 of capacitor $C_1$, defined by conductive land portion 28, is electrically connected to one end of the inductor coil 26, and the first plate of capacitor $C_2$, defined by conductive land portion 34, is likewise electrically connected to the other end of the inductor coil 26. On the capacitor side shown in FIG. 2, the second plate 30 of capacitor element $C_1$, defined by conductive land portion 30, is electrically connected to the second plate 36 of capacitor element $C_2$ by a connecting strip of electrically conductive material 38. The respective second plates 30 and 36 of the first and second capacitors $C_1$ and $C_2$ are not electrically connected to the conductive pattern on the first, coil side of the resonant tag.

As shown on the capacitor side in FIG. 2, the capacitor $C_1$, comprising a first, top plate 28 (FIG. 1) and second, bottom plate 30, also includes another element useful in the present invention, but not essential to its functionality as a capacitance element $C_1$ in the inductive capacitance circuit 12 (FIG. 4). The additional element is an extension 42 (on the capacitor side, FIG. 2) of the top plate 28 (on the coil side, FIG. 1) that is electrically connected via a weld through connection 40 to the top plate 28 of $C_1$. The extension 42 of the top plate 28 is adjacent to but does not contact the second capacitor plate 30, as is shown in FIG. 2. The distance or spacing between the bottom capacitor plate 30 and the adjacent extension 42 of top plate 28 is maintained sufficiently large to avoid inadvertent short circuiting between the bottom plate 30 and extension 42. The proximity of the extension member 42 of top plate 28 to the bottom plate 30 of the capacitor $C_1$ facilitates the stabilization of the resonant tag circuit 10 against inadvertent activation of the detection/identification circuit by antistatic discharge, and this stabilization is accomplished with a semiconductive antistatic material which is overlaid in contact with both of these exposed elements, as described in more detail below. The configuration of the extension 42 of the top plate 28 shown in FIG. 2 is intended to be illustrative of but not limiting the scope of the present invention. Other configurations that accomplish the desired objective will be apparent to those skilled in the art, based on the principles of the invention disclosed herein, and these other variants are within the scope of this invention.

In the presently preferred embodiment, the resonant tag circuit 10 also includes a means for electronically activating the detection/identification resonant circuit of the tag 10, such as a shorting means for short-circuiting the plates of capacitor $C_1$ and thereby deactivating the capacitance function of capacitor $C_1$.

Referring both to FIG. 2 and to the cross-section view shown in FIG. 3A, the bottom capacitor plate 30 of capacitor $C_1$ includes a deactivating means which is an indented short-circuiting portion 44, typically having the appearance of a dimple, extending in a direction towards the top capacitor plate 28, i.e., into the dielectric 14 separating the two plates. The indentation point 44 is, strictly speaking, a means for deactivating a capacitance element in the circuit, via a short circuit across the plates of the capacitor. As described below, a preferred resonant tag circuit of this invention contains two capacitors, each of which is capable of being deactivated via operation of a "deactivation point"

or indentation point. It should be recognized that deactivation of the first of the two capacitors serves to activate the detectable/identifiable resonant tag circuit and deactivation of the second capacitor serves to deactivate the resonant tag circuit as well. Consequently, a "deactivation point" in an electrical element of a circuit in this invention may be used to either activate or deactivate a detectable/identifiable resonant tag circuit and may be triggered by either an activation field or a deactivation field used respectively to activate the tag or deactivate the tag, as the case may be.

The indentation 44 may be made at any single point or at multiple points (e.g., two points as shown in FIG. 2) and may be made either on one plate (e.g., as shown in FIGS. 2,3) or both plates of parallel plate capacitor $C_1$. This indentation point 44 reduces the voltage required to short the capacitor $C_1$, during activation of the resonant tag circuit 10 by exposure of the tag 10 to an activation RF field. When sufficient energy is coupled to the circuit at the activation resonant frequency, the voltage increases across the capacitor plates 28 and 30 of capacitor $C_1$ until a short circuit occurs between the plates of capacitor $C_1$. This results in the desired activation of the resonant tag circuit 10, by the short circuit deactivation of capacitor $C_1$ at deactivation point 44 and the consequent frequency shift in the circuit to the detection/identification resonant frequency.

Once the resonant tag circuit 10 is activated in this manner, it becomes capable of being detected or identified at the detection/identification resonant frequency in a surveillance zone of the EAS.

In a manner analogous to that used for activating the resonant tag circuit 10, the activated tag may likewise be electronically deactivated. As shown in FIGS. 2 and 3B, capacitor $C_2$ which is integral to the detection/identification resonant circuit may likewise include indented points 46 in the bottom capacitor plate 36. Such indented points 46 (two being shown in FIG. 2) are identical (but need not be) in configuration and function to those described above for activating the resonant tag circuit 10. The resonant tag circuit 10 may be deactivated by exposing the tag 10 to the detection/identification frequency at a predetermined energy level which is higher than the RF field strength used for detecting and identifying the activated tag. Although the detection/identification frequency and the predetermined deactivation frequency are preferably the same frequency, as used in the preferred embodiments shown in the drawings, different frequencies could alternatively be used if desired. The deactivation of the tag 10 is generally carried out at the point of sale for an article carrying the activated tag, in a deactivation field or zone that is a separated (or another) part of the EAS system.

The tag deactivation means described above, i.e., the indented portion 46 of the resonant tag circuit 10, may be utilized in portions of the circuit other than in capacitor $C_2$ as described. U.S. Pat. No. 4,498,076 (Lichtblau) describes various embodiments of resonant circuit tags that incorporate an indented portion of the conductive circuit, not only in a capacitance element but alternatively elsewhere in the circuit, as a deactivation means. Such alternative deactivation (or circuit activation) means are intended to be within the scope of this invention.

The present invention is directed to the stabilization of activatable and deactivatable resonant tag circuits such as shown in FIGS. 1, 2, 3A and 3B and effects such stabilization as follows. As shown in FIGS. 2 and 3A, capacitor $C_1$ in the resonant tag circuit 10 of this invention includes a nonaqueous semiconductive antistatic material 50, having an ionizable salt dissolved therein, which provides a semiconductive connection between the capacitor bottom plate 30 and top plate 28, via a conductive extension 42 of plate 28 that is electrically connected to plate 28 via a weld through connection 40 and that is adjacent to bottom plate 30. Likewise, as shown in in FIGS. 2 and 3B, capacitor $C_2$ in the resonant tag circuit 10 also includes a semiconductive antistatic material 52, having an ionizable salt dissolved therein, which provides a semiconductive connection between the capacitor bottom plate 36 and top plate 34, via a conductive extension 54 of plate 34 that is electrically connected to plate 34 via a weld through connection 56 and that is adjacent to bottom plate 36. These respective semiconductive electrical connections stabilize the resonant tag circuit against inadvertent activation or deactivation from electrostatic discharge but still permit the resonant tag circuit 12 to be activated and deactivated as described above and do not degrade the performance of the activated resonant circuit 12 in providing detection/identification functionality in an electronic article surveillance system. The semiconductive antistatic material 50, 52 provides a semiconductive bridge across the deactivation point that is an indirect connection, i.e., a parallel semiconductive electrical connection, that links conductive elements on both sides of the deactivation point. While not wishing to be bound by any particular theory or mechanism, the inventors believe that the ionized salt in the antistatic material provides an electrical path for the electrostatic charge to drain off before the charge accumulates to a level that results in premature short circuiting at the deactivation point, e.g., the indented point on the capacitor.

The embodiment described for FIGS. 1–3, in which the semiconductive antistatic material is used to connect the plates of a capacitor containing a deactivation indentation point, is preferred. However, the semiconductive antistatic material could alternatively be used in other parts of the resonant circuit, that contain a deactivating and/or activating means and/or switching means, to provide a semiconductive connection across the deactivation, activation and/or switching point, bridging conductive or semiconductive material in the circuit on both sides, i.e., on either side, of the deactivation, activation and/or switching point.

The semiconductive antistatic material of this invention (50 in FIG. 2 and 3A and 52 in FIG. 2 and 3B) preferably comprises a polymer carrier and an ionizable salt dissolved therein. Using capacitor $C_1$ in the resonant tag circuit 10 by way of illustration and as shown in FIGS. 2 and 3A, the antistatic material 50 is overlaid onto adjacent exposed portions of the bottom capacitor plate 30 and the conductive extension 42 (via weld through connection 40) of the top capacitor plate 28, both of which reside on the bottom surface 18 (capacitor side) of the dielectric substrate 14 in close proximity to each other.

The semiconductive antistatic material of this invention is characterized by containing an ionizable salt, preferably a lithium salt, and the ionizable salt provides the antistatic material with the desired semiconductive properties. The resistivity provided by the ionizable salt-containing material is preferably in the range of about $10^3$ to about $10^8$ ohms per square.

The semiconductive antistatic material of this invention preferably comprises a polymer carrier in which is dissolved the ionizable salt. The polymer carrier is preferably a polyethylene glycol or polyethylene glycol derivative or other compound with performance characteristics substantially similar to the preferred polyethylene glycol. With the preferred lithium salt in a polymer carrier that is polyethylene glycol, the resistivity is preferably about $10^4$ to about $10^7$ ohms per square and more preferably about $10^5$ to about $10^6$ ohms per square.

The polyethylene glycol is preferably a liquid and is more preferably a viscous liquid at a temperature within the range of about 10° C. to about 30° C. Preferred polyethylene glycols are those having a number average molecular weight of from about 200 to about 900, more preferably from about 300 to about 600. The viscosity (measured at 210° F./99° C.) of the preferred polyethylene glycols is preferably in the range of about 4 centistokes to about 15 centistokes.

A particularly preferred polyethylene glycol is polyethylene glycol having a number average molecular weight of 400 (sometimes referred to as "polyethylene glycol 400" or "PEG 400"), a viscosity (210° F./99° C.) of about 7.3 centistokes and a melting temperature of about −6° C. to about 8° C.

Derivatives of polyethylene glycol, e.g., polyoxyethylene based compounds, may also be used as the carrier for the ionizable salt, provided that their properties and characteristics are substantially similar to those of the preferred polyethylene glycols.

Derivatives of polyethylene glycol include polyethylene glycol esters, e.g., polyethylene glycol monoesters resulting from reaction of an organic acid (e.g., acetic acid) with hydroxyl ends of the polyethylene glycol; polyethylene glycol ethers, e.g., methyl ether or butyl ether; and other end-reacted derivatives of polyethylene glycol. It is preferred that such end-reacted polyethylene glycol derivatives include some unreacted or uncapped hydroxyl groups, since such unreacted hydroxyl groups are believed to improve the solubility of the ionizable salt in the polymer carrier. The polyethylene glycol derivatives may also include surfactants derived from polyethylene glycol such as polyoxyethylene derivatives of fatty acids and polyoxyethylene sorbitan esters of fatty acids, also called polysorbates; examples include polyoxyethylene monolaurate, polyoxyethylene glycol sorbitan oleate or laurate, polyoxyethylene sorbitan monolaurate, polyoxyethylene sorbitan monopalmitate, polyoxyethylene sorbitan monostearate (available from ICI Americas, Inc., Wilmington, Del., U.S.A. under the trademark Tween® and from Witco Corporation, Memphis, Tenn., U.S.A. under the trademark Polycon®).

Likewise, other polymer carriers or polymer substitutes may be used as the carrier for the ionizable salt in place of the preferred polyethylene glycol, provided that such carriers exhibit characteristics substantially equivalent to those of the preferred polyethylene glycol and, in particular, solubilize the ionizable salt and provide the desired semiconductivity. Such antistatic materials are intended to include, but not be limited to, a polymer carrier containing the ionizable salt dissolved therein as described above.

Carriers, e.g., the polymer carrier, for the ionizable salts in the antistatic material should possess the following properties and characteristics per se, i e., before addition of the ionizable salt: at least moderately polar; relatively nonvolatile (at temperatures below about 40° C.); relatively nonconductive; capable of solubilizing the ionizable salt; essentially nonreactive with the ionizable salt so that the ionizable salt may dissociate (ionize) and mobilize its ion species; compatible with and noncorrosive to the dielectric substrate material, conductive material and other materials used in the resonant tag circuit; preferably a viscous or thickened liquid (as compared with the viscosity of water), a gelled liquid, a semisolid or a solid paste, so as not to flow off the area on the resonant tag circuit upon which it is applied or deposited; if a solid, the carrier should withstand flexing or bending of the tag without detriment to its intended function. Other properties or characteristics that are preferred for suitable carriers include being nontoxic; substantially nonaqueous; substantially neutral in pH; capable of being applied as a thin coating or layer onto a resonant tag circuit using conventional coating techniques; and compatible with any release sheet and/or adhesive layer applied over the resonant tag circuit.

The ionizable salt utilized in this invention includes without limitation salts of alkali metals, salts of alkaline earth metals, and ammonium salts, including, but not limited to, lithium salts such as lithium bromide, lithium chloride, lithium iodide, lithium carbonate, lithium nitrate, lithium sulfate, lithium chlorate, lithium perchlorate, lithium sulfonate, lithium acetate, lithium citrate, lithium vanadate, lithium thiocyanate, lithium trifluoromethyl sulfonate, lithium fluorosilicate, and their hydrates; sodium salts, such as sodium bromide, sodium iodide, sodium perchlorate, sodium thiocyanate and their hydrates; potassium salts such as potassium bromide and their hydrates; magnesium, calcium, barium and other alkaline earth metal salts; ammonium sulfate and its hydrates; and the like. Other metal salts, e.g, manganese salts and transition element salts, may also be used.

Lithium salts are preferred, and lithium bromide, lithium iodide and lithium chloride are the most preferred lithium salts.

The ionizable salts must be capable of being solubilized and ionized in the carrier material, e.g., polymer carrier, which is preferably nonaqueous. The ionizable salts should be solubilized in the antistatic material, e.g., in the polyethylene glycol or other equivalent polymer carrier, in an amount of from about 0.01 to about 5 wt %, based on the total weight of the semiconductive antistatic material. The ionizable salts are preferably present in an amount of not more than 1 wt %, based on the total weight of the semiconductive antistatic material.

The ionizable salt is added to the carrier material in an appropriate amount or concentration to provide the desired resistivity in the semiconductive antistatic material. With the preferred polymer carrier, the ionizable salt is mixed with the carrier to dissolve the salt in the carrier. With the preferred lithium salts in polyethylene glycol, the dissolution of the salt may be carried out at ambient temperature, about 20°–25° C., with stirring. With this and other polymer carriers, the ionizable salt may optionally first be dissolved in a solvent or solubility enhancer before being solubilized in the carrier, to promote rapid dissolution of the salt in the polymer carrier.

The semiconductive antistatic material may also contain additives or adjuvants, such as coloring agents like pigment and dyes; antioxidants; stabilizers; fillers; wetting agents like surfactants; lubricants; salt solubility enhancers, such as diethylene glycol and small amounts (less than 5 wt %) of water; and the like may also be incorporated into or added to the ionizable salt composition of this invention. These additives are generally present in minor amounts, e.g., from about 0.01 to about 5 wt %, based on the total weight of the semiconductive antistatic material. Such additives may be used provided that they do not adversely affect the dissociation and/or ion mobility and/or overall conductivity of the ionizable salt in the polyethylene glycol or other polymer carrier; i.e., the overall conductivity and antistatic characteristics should not be degraded by the presence of a candidate additive. Such additives should also not substantially alter the low volatility characteristics of the semiconductive polymer material.

Another category of particularly advantageous additives includes thickeners, gelling agents and other viscosity-modifying agents, particularly where the polymer carrier is a liquid other than the preferred polyethylene glycol, to provide viscosity characteristics similar to those of the preferred polyethylene glycol. One thickener material that may be used with satisfactory results is colloidal silica. Other thickening agents include finely powdered calcium silicate, clays, and cellulosic derivatives such as nitrocellulose.

Agents that improve the solubility of the ionizable salt in the liquid polymer carrier may also be employed, such as ethylene glycol or diethylene glycol.

Application of the ionizable salt dissolved in the polymer carrier onto the resonant tag circuit may be carried out by conventional coating methods, such as knife coating, Mayer bar coating, extrusion die coating, brush coating and the like. Printing techniques such as silkscreen, rotary letter press, and offset lithography can also be used for precise application of the applied layer or coating.

It is important to note that the preferred semiconductive antistatic material may be applied neat, without the need to use volatile solvents or water. The absence of volatile solvents or the like permits subsequent manufacturing steps on a tag web to be carried out without delay, e.g., without the need for a drying step. The absence of volatile solvents and water in the semiconductive antistatic material also reduces the likelihood of deterioration of its semiconductive properties over long periods of time, e.g., during long term storage of the tags prior to their use.

The semiconductive antistatic material is preferably applied to specific and limited portions of the resonant tag circuit, e.g., covering or overlaying exposed portions of both plates of a capacitor in the resonant circuit, where the exposed portions are located in proximity to each other on one surface of the dielectric substrate. The localized applications of the material may be in the form of a continuous or discontinuous strip, stripe or stripes or may be in the form of other shapes, e.g., a dot, including irregular or oval shapes such as shown in FIG. 2, that provide the desired coverage of specific areas. The applied semiconductive antistatic material is applied in such a manner as not to adversely affect the desired electrical functionality of other components of the resonant tag circuit, e.g., the inductor coil. The localized material preferably covers a very limited portion, preferably less than about 10%, of the total surface area of the surface of the resonant tag circuit on which the material resides. The material may be applied to either or both surfaces of the resonant tag circuit, as desired.

The applied semiconductive antistatic material is preferably less than about 5 mils (0.13 mm) in thickness and, more preferably, no more than 2 mils (0.051 mm) in thickness.

An important property of the semiconductive material of this invention that uses the preferred polyethylene glycol or equivalent polymer carrier for the ionizable salts is that the applied layer or coating exhibits excellent flexibility and strength. Consequently, the integrity and performance functionality of the material on the resonant tag circuit is not adversely affected by removal of the tag from a continuous web of tags, application of the tag to an article to be protected, or other activities involving the protected article.

The semiconductive antistatic material 50 preferably overlays a limited area of the resonant circuit on one side of the dielectric substrate that contains exposed conductive portions of both plates of a capacitor which also contains a deactivation means, e.g., an indentation point. Referring to FIGS. 2, 3A and 3B, the semiconductive antistatic material 50, 52 is carried on a small portion of the bottom surface 18 of the resonant tag circuit 10 where the semiconductive antistatic material 50, 52 is in direct contact with at least a portion of the conductive material that forms the respective bottom plates 30, 36 of the capacitors $C_1$ and $C_2$ and adjacent, proximate portions of extensions 42, 54 of the top plates 28, 34 of capacitors $C_1$ and $C_2$. Bottom plates 30, 36 of capacitors $C_1$ and $C_2$ carry the capacitor deactivation means, i.e., indentation points 44,46.

Once the semiconductive antistatic material 50, 52 has been applied to the resonant tag circuit, the semiconductive material 50, 52 begins to serve its intended function of stabilizing the resonant tag circuit 10 against electrostatic discharge, not only during subsequent manufacturing steps but also throughout the useful life cycle of the tag, including during active use of the tag in its intended purpose, ie., affixed or otherwise secured to an article being protected in an EAS system. No farther operational or treatment steps are necessary, e.g., no curing, heating, or drying step or tag die cutting step is needed. With the preferred polyethylene glycol carrier, the semiconductive antistatic material 50, 52 satisfactorily adheres to the resonant tag circuit even though the polymer carrier is in a liquid state.

Figure 5:
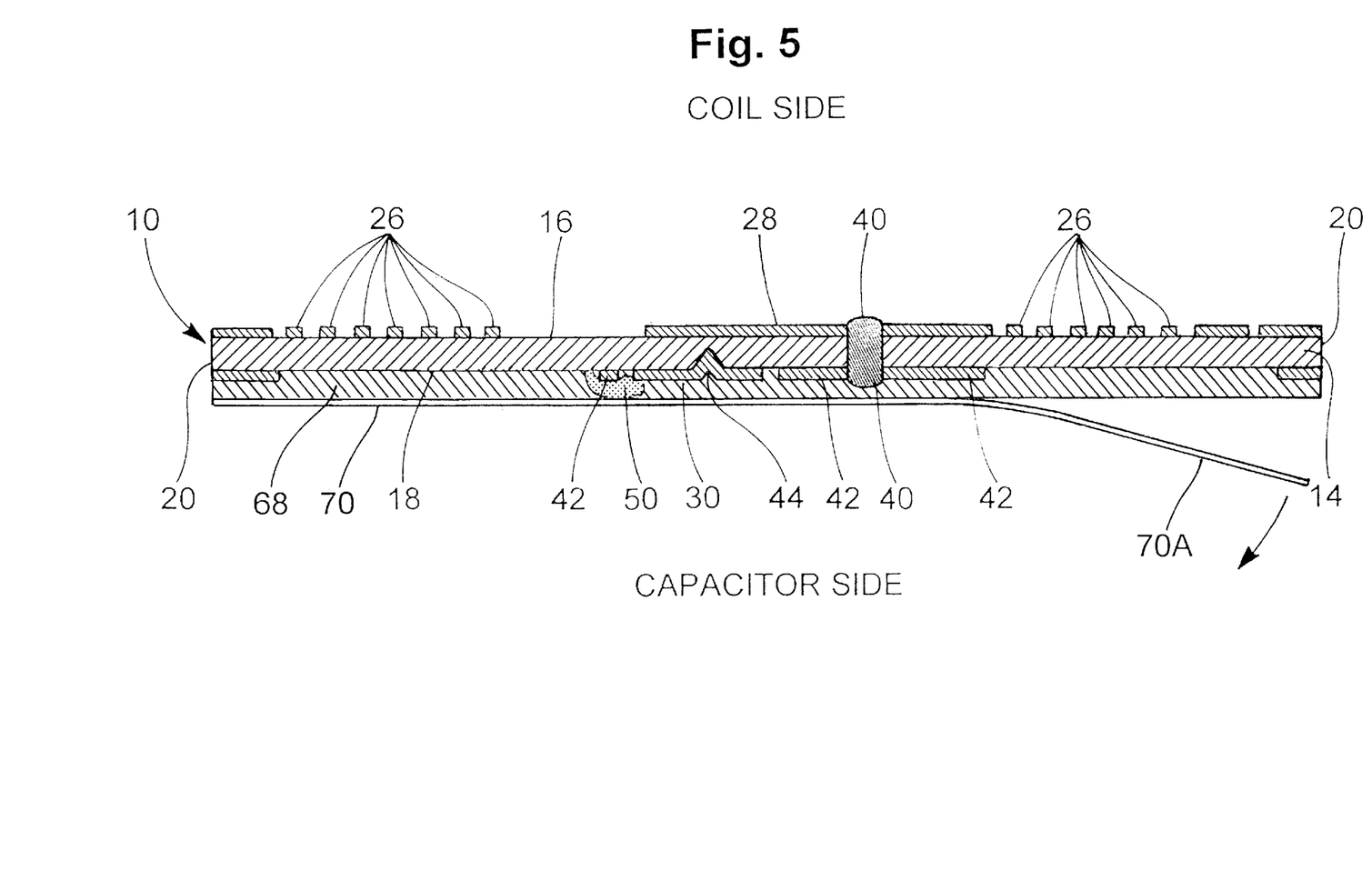
FIG. 5 is a cross-sectional view of a resonant tag circuit in another preferred embodiment of the invention, in which a release sheet and adhesive layer are overlaid on the first embodiment shown in FIG. 3A.

FIG. 5 illustrates a cross-sectional view of another embodiment of the resonant tag circuit of this invention which comprises the addition of an adhesive layer 68 overlaying or coating one of the exposed surfaces of the resonant tag circuit 10. The adhesive layer 68 may be present alone but, as shown in FIG. 5, is preferably used in combination with a release sheet 70, which serves to protect the adhesive layer 68 prior to its intended use, e.g., for affixing the tag to an article or to the article's packaging. The release sheet 70 is peeled off of the resonant tag circuit 10, as shown by portion 70A in FIG. 5 being lifted away from the adhesive layer 68, when the tag is ready to be affixed to an article (not shown).

The adhesive layer 68 may be applied by conventional adhesive coating equipment and techniques and, when used in conjunction with the preferred release sheet 70, may be carried on the release sheet 70 when applied to the resonant tag circuit. The adhesive 68, when used with a release sheet, is preferably carried on the side of the resonant tag circuit having the semiconductive antistatic material 50 of this invention, i.e., on the bottom surface 18, as shown in FIG. 5. The adhesive 68 is preferably a pressure sensitive adhesive, e.g., an acrylic resin; other types of adhesives may also be used. The thickness of the adhesive coating is preferably about 1 mil (0.025 mm) or less.

The release sheet 70 is preferably flexible and planar, more preferably being a continuous film or sheet with high tensile strength. Such high tensile strength facilitates its subsequent removal by peeling, as well as its application to the resonant tag circuit 10 during manufacture, typically while carrying a layer of adhesive 68. The release sheet 70 may be paper, a thin film polymeric material, or the like.

The adhesive layer 68 is desirably selected to be compatible with the sermiconductive antistatic material 50 having the ionizable salt dissolved therein and in particular, should not adversely interfere with the antistatic properties of the applied material. It should be understood that some migration may possibly occur of the semiconductive antistatic material, particularly the preferred polyethylene glycol and ionizable salt dissolved therein, into the adhesive layer 68 that is overlaid on the semiconductive antistatic material 50 and is in contact with it, but the antistatic properties of the material 50 are ordinarily not adversely affected by such migration. However, such migration is minimized by the presence of thickeners such as silica in the semiconductive material. The semiconductive antistatic material of this invention may alternatively be applied in combination with an adhesive layer, e.g., being incorporated in the adhesive layer that is applied to the resonant tag circuit as described above, and this embodiment is intended to be within the scope of the present invention.

The resonant tag circuit 10 of this invention is intended for use in an electronic article security system, being adapted to be secured or otherwise carried by an article or item for which security or surveillance is sought. The resonant tag circuit may be secured to the article or item at a retail facility or may be incorporated into or secured to the article at the point of manufacture. Use of the device in electronic article security systems is well known in the art and a complete detailed description of the structure and operation of such electronic article security systems is unnecessary for understanding the present invention as disclosed herein. Electronic security systems utilizing resonant tag circuits are generally well known in the art and are commercially available from several manufacturers, including Checkpoint Systems, Inc., the assignee of the present invention.

From the foregoing description, it can be seen that the present invention comprises a security tag for use with an electronic security system. It will be recognized by those skilled in the art that changes may be made to the above-described embodiment of the invention without departing from the broad inventive concepts thereof. It is understood, therefore, that this invention is not limited to the particular embodiment disclosed, but is intended to cover any modifications which are within the scope and spirit of the invention as defined by the appended claims.

We claim:

1. A resonant tag circuit useful as an electronic security device, comprising a layered planar structure having a dielectric substrate with first and second opposing principal surfaces; a resonant circuit capable of resonating at at least one predetermined frequency and comprising a pattern of conductive material carried on each of the opposing surfaces of the dielectric substrate, said resonant circuit including at least one activation or deactivation point for creating a short circuit or open circuit in the resonant circuit upon exposure of the resonant circuit to an activation or deactivation field at a predetermined energy level; and a semiconductive antistatic material having an ionizable salt dissolved therein, said antistatic material being applied on a portion of one surface of the dielectric substrate to provide a semiconductive bridge across at least one activation or deactivation point in the resonant circuit by contacting conductive material in the circuit on both sides of the point.

2. The resonant tag circuit of claim 1 wherein the ionizable salt is selected from the group consisting of salts of lithium, sodium, potassium and ammonium.

3. The resonant tag circuit of claim 2 wherein the ionizable salt comprises a lithium salt selected from the group consisting of lithium bromide, lithium chloride, lithium iodide, lithium carbonate, lithium nitrate, lithium sulfate, lithium chlorate, lithium perchlorate, lithium sulfonate, lithium acetate, lithium citrate, lithium vanadate, lithium thiocyanate, lithium trifluoromethyl sulfonate, lithium fluorosilicate and hydrates of these salts.

4. The resonant tag circuit of claim 1 wherein the antistatic material comprises a polymer carrier selected from the group consisting of polyethylene glycol and derivatives of polyethylene glycol.

5. The resonant tag circuit of claim 4 wherein the polymer carrier comprises polyethylene glycol having a number average molecular weight of from about 200 to about 900.

6. The resonant tag circuit of claim 1 wherein the antistatic material is selected from the group consisting of viscous liquid, gelled liquid, semisolid and solid paste.

7. The resonant tag circuit of claim 1 wherein the antistatic material is applied to the surface in the shape of a thin strip or dot.

8. The resonant tag circuit of claim 1 wherein the semiconductive antistatic material has a resistivity in the range of about $10^3$ to about $10^8$ ohms per square.

9. The resonant tag circuit of claim 1 wherein said resonant circuit comprises an inductor and a parallel plate capacitor having a first plate on the first surface and a second plate on the second surface, the second plate being electrically connected through the dielectric substrate to a conductive member that is not the inductor and that is located on the first surface, said semiconductive antistatic material overlaying and contacting at least a portion of the first plate and at least a portion of the conductive member.

10. The resonant tag circuit of claim 9 wherein the deactivation point is located on at least one plate of the capacitor and deactivates the capacitor in the resonant circuit by creating a short circuit in the capacitor upon exposure of the resonant circuit to the deactivation field.

11. The resonant tag circuit of claim 10 wherein the deactivation point is at least one indentation on the plate.

12. The resonant tag circuit of claim 10 which further comprises a second parallel plate capacitor that also has a deactivation point to deactivate the second capacitor by creating a short circuit upon exposure of the resonant circuit to a second deactivation field, different from the first-mentioned deactivation field.

13. The resonant tag circuit of claim 1 which further comprises a continuous layer of adhesive overlaying the surface on which said antistatic material is applied.

14. The resonant tag circuit of claim 13 which further comprises a release sheet overlaying the adhesive layer.

15. A resonant tag circuit useful as an electronic security device, comprising a layered planar structure having a dielectric substrate with first and second opposing principal surfaces; a resonant circuit capable of resonating at at least one predetermined frequency and comprising a pattern of conductive material carried on each of the opposing surfaces of the dielectric substrate, said resonant circuit including a parallel plate capacitor having a first plate on the first surface and a second plate on the second surface, said second plate being electrically connected through the dielectric substrate to a conductive member located on said first surface in proximity to, but not contacting, the first plate; and a semiconductive antistatic material containing an ionizable salt that overlays and contacts at least a portion of the first plate and at least a portion of the conductive member to provide a semiconductive bridge between said first plate and said conductive member.

16. The resonant tag circuit of claim 15 wherein the ionizable salt is selected from the group consisting of salts of lithium, sodium, potassium and ammonium.

17. The resonant tag circuit of claim 16 wherein the ionizable salt comprises a lithium salt selected from the group consisting of lithium bromide, lithium chloride, lithium iodide, lithium carbonate, lithium nitrate, lithium sulfate, lithium chlorate, lithium perchlorate, lithium sulfonate, lithium acetate, lithium citrate, lithium vanadate, lithium thiocyanate, lithium trifluoromethyl sulfonate, lithium fluorosilicate and hydrates of these salts.

18. The resonant tag circuit of claim 15 wherein the semiconductive antistatic material comprises a polymer selected from polyethylene glycol and derivatives of polyethylene glycol.

19. The resonant tag circuit of claim 18 wherein the polymer comprises polyethylene glycol having a number average molecular weight of from about 200 to about 900.

20. The resonant tag circuit of claim 15 wherein the semiconductive antistatic material containing the ionizable salt is selected from a viscous liquid, a gelled liquid, a semisolid and a solid paste.

21. The resonant tag circuit of claim 15 wherein the semiconductive antistatic material is applied to the surface in the shape of a thin strip or dot.

22. The resonant tag circuit of claim 15 wherein the semiconductive antistatic material has a resistivity in the range of about $10^3$ to about $10^8$ ohms per square.

23. The resonant tag circuit of claim 15 which further comprises a deactivation point on at least one plate of the capacitor for deactivating the capacitor in the resonant circuit by creating a short circuit in the capacitor upon exposure of the resonant circuit to a predetermined deactivation field.

24. The resonant tag circuit of claim 23 wherein the deactivation point is at least one indentation on the plate.

25. The resonant tag circuit of claim 23 which further comprises a second parallel plate capacitor that also has a deactivation point to deactivate the second capacitor by creating a short circuit upon exposure of the resonant circuit to a second deactivation field, different from the first-mentioned deactivation field.

26. The resonant tag circuit of claim 15 which further comprises a continuous layer of adhesive overlaying the first surface.

27. The resonant tag circuit of claim 26 which further comprises a release sheet overlaying the adhesive layer.

* * * * *

UNITED STATES PATENT AND TRADEMARK OFFICE
CERTIFICATE OF CORRECTION

PATENT NO. : 5,841,350  
DATED : November 24, 1998  
INVENTOR(S) : Appalucci et al.

Page 1 of 1

It is certified that error appears in the above-identified patent and that said Letters Patent is hereby corrected as shown below:

Title page,
Item [54], Title, please replace the word "INDENTIFICATION" with
-- IDENTIFICATION --.

Signed and Sealed this

Tenth Day of May, 2005

JON W. DUDAS
*Director of the United States Patent and Trademark Office*